United States Patent

[11] 3,610,519

| [72] | Inventors | Svetislav M. Radosavljevic<br>Chicago, Ill.;<br>Verner John Raelson, Valparaiso, Ind. |
|---|---|---|
| [21] | Appl. No. | 4,001 |
| [22] | Filed | Jan. 19, 1970 |
| [45] | Patented | Oct. 5, 1971 |
| [73] | Assignees | Svetislav M. Radosavljevic;<br>Verner John Raelson<br>, part interest to each |

[54] CALCULATOR
7 Claims, 5 Drawing Figs.

[52] U.S. Cl. .................................................. 235/61 GM,
33/76, 35/34
[51] Int. Cl. ....................................................... G01b 5/24,
G09b 23/04
[50] Field of Search ........................................... 235/61, 61
B; 33/76, 97; 35/34

[56] References Cited
UNITED STATES PATENTS

| 1,955,392 | 4/1934 | Shimberg ..................... | 33/76 |
| 2,627,114 | 2/1953 | Sprecher ...................... | 33/76 |
| 2,701,096 | 2/1955 | Wattier ........................ | 235/61 GM |
| 3,345,752 | 10/1967 | Gabriel........................ | 33/97 |
| 3,359,653 | 12/1967 | Redfern........................ | 35/34 |
| 3,414,190 | 12/1968 | Lemiesz ....................... | 235/61 GM |

Primary Examiner—Stephen J. Tomsky
Attorney—Richard G. Kinney

ABSTRACT: A mechanical analog computing device is disclosed that includes a planar base on which a rotatable transparent flat elongated arm is affixed. The arm defines a rotatable index line that may lay over any part of a rectangular coordinate grid having a center at the point of attachment of the arm to the base. About the grid is defined two angle scales in radians and degrees for reading the angular setting of the arm line. Unit circle, $x=1$ and $y=1$ lines are conspicuously defined on the grid to allow the trigonometric functions to be read directly thereon and reciprocal scales are provided on the arm for the conversion between reciprocal values. A slide is affixed on the arm defining a movable hairline that is perpendicular to the arm line. The other side of the planar base forms part of a circular slide rule whose disc and hairline half-arm are attached by the same fixture as is the rotatable arm.

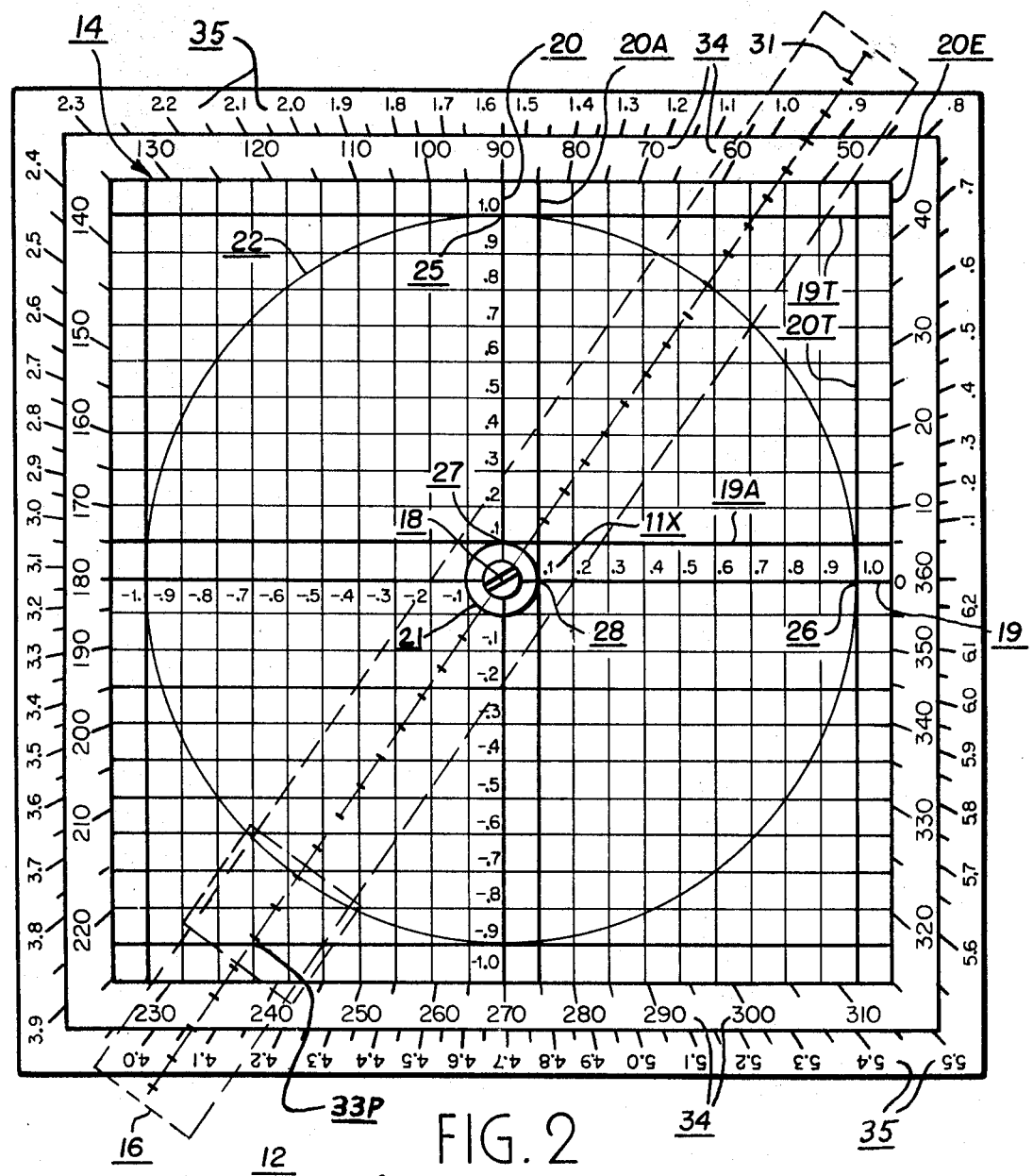
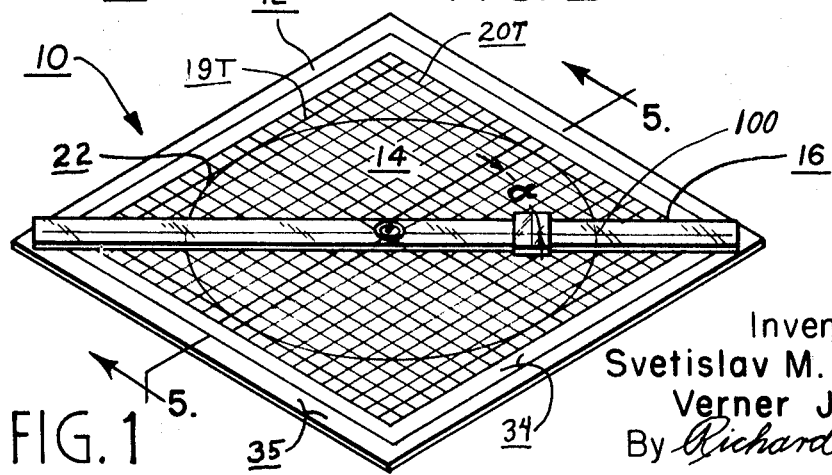

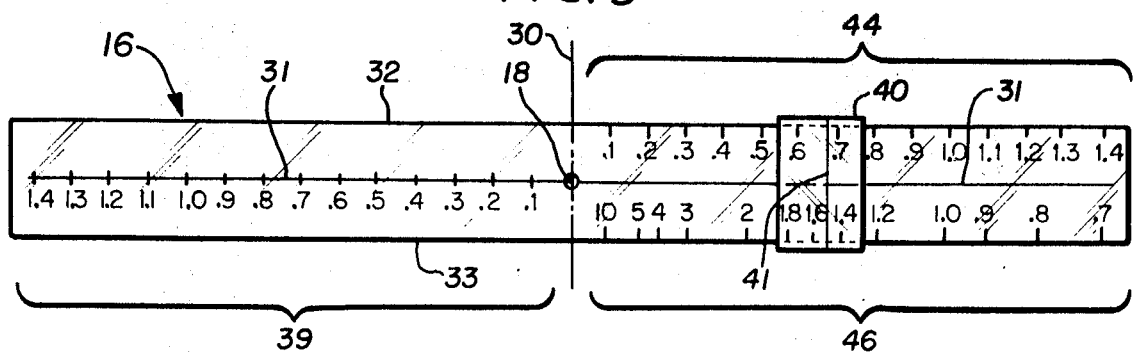
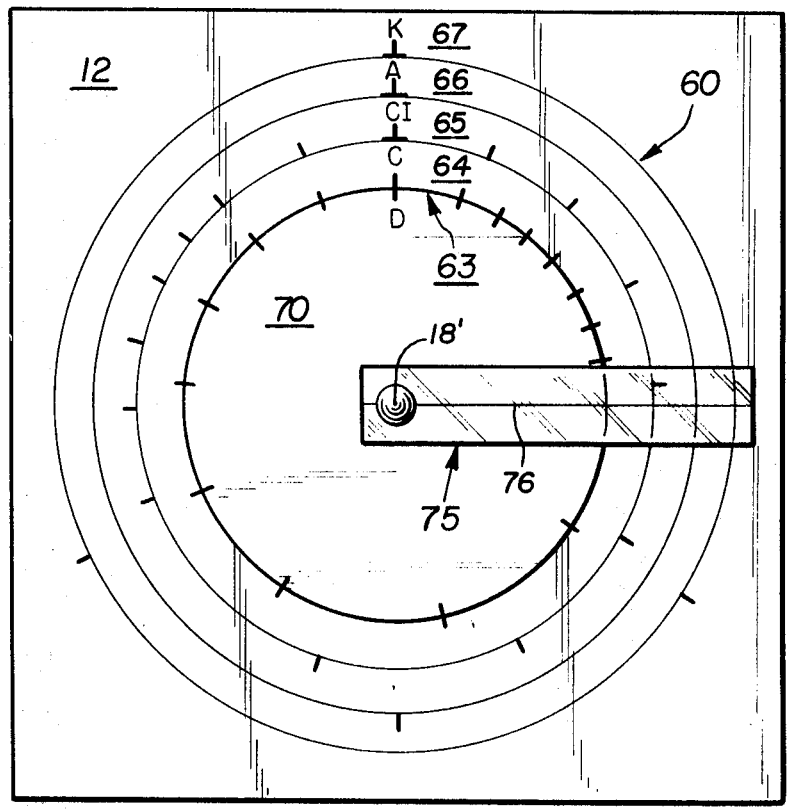
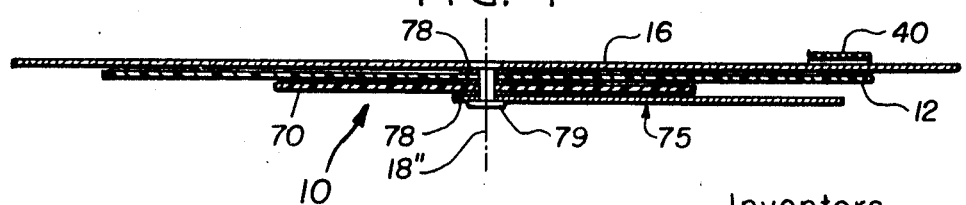
Inventors
Svetislav M. Radosavljevic
Verner J. Raelson
By *Richard G. Kinney*
Attorney

CALCULATOR

1. Filed of the Invention

The present invention relates to a new and improved calculator, and especially relates to a new and improved mechanical analog computing aid which is of special utility in determining the values of trigonometric and inverse trigonometric functions and in resolving vectors into their rectangular or polar coordinates and for other calculations involving trigonometric functions. The present invention may also find use, in some forms, as a teaching device or visual aid in teaching trigonometric and vector relationships.

2. Background of the Invention

Mechanical analog computing aids of the slide rule type have come into general use by engineers, students and others who are interested in carrying out calculations of some complexity. Although some crude approaches to the common slide rule are dated as early as the seventeenth century, it was not until 1859, when Mannheim developed the slide rule that bears his name, that such instruments started to come into general use.

Trigonometric scales on slide rules were not introduced until 1939, according to the historical note contained in Kells, et al., "Log Duplex Decitrig Slide Rule Manual," Keuffel & Esser Company, New York (1947). As the present invention is concerned in part with a substitute for and improvement over the trigonometric scales of the common slide rule in some of their uses, a closer review of those scales and their operation will here be taken up. Certain advanced slide rules, notably, for example, the K & E "Log Duplex Decitrig" slide rule include added "S," "T" and "ST" and "SRT" scales. These scales represent the values of the corresponding inverse or arc sine (and, often, arc cosine), and arc tangent (or cotangent) for the values set out on the "C" or "D" (or "CI" or "DI") scales (whichever scale is in fixed spacial relationship to the trigonometric scales). The "ST" or "SRT" scale is really a continuation of the "S" scale for small values of the angle wherein the sine and tangent have approximately the same value. The "S" scale covers arc sines from approximately 5°44' to 84°16' and arc cosine from approximately 0° to 84°16'A. The "ST" or "SRT" scale covers arc sines and arc tangents from approximately 0°34' to 5°44', and the "T" scale covers arc tangents and arc cotangents from 5°44' to 84°16'.

Despite the general usefulness of the trigonometric scales on the slide rule they are subject to certain drawbacks. Among these drawbacks are the lack of complete coverage of the angles for all the functions, the difficulty, especially when dealing with vectors, of determining the sign (+ or −) of the resulting numbers, the necessity of interpretation and separate calculations for use with angles outside of the first or positive quadrant, for example, the angle of 132°, and the inherent limitations in accuracy at certain areas of the logarithmic scale, in which the space between successive numbers is smaller and thus the scale cannot be read in those areas with as great an accuracy as in others.

It is thus one object of the present invention to provide a new and improved calculator that overcomes one or more of the aforementioned disadvantages of the ordinary trigonometric slide rule. The present invention is essentially concerned with a mechanical device for obtaining the numerical value of the trigonometric and inverse trigonometric functions for any value of their arguments easily, quickly, and accurately. It can be also used, but is not limited thereto, for obtaining the solutions of such problems as the solution of the right triangle in trigonometry, the determination of the component of a vector in any given direction, the resolution of a vector into its rectangular components, the manipulation of vectors by the method of rectangular components, the transformation of degrees to radians and vice versa, the transformation of a complex number from its rectangular components to the polar form and vice versa, and the computation of impedance, admittance, voltage, current and power factor in electrical and electronic circuits.

In teaching trigonometric functions, one method of introducing them in beginning courses in trigonometry is to define them in terms of the rectangular coordinates of the points on a unit circle or on certain lines tangent to the unit circle. The point is specified as the point of intersection of the unit circle or one or these tangent lines and the terminal side of the angle whose vertex is at the origin of the coordinate system and whose initial side coincides with the positive side of the axis of abscissas. By laying off a given angle in this way and reading off the coordinates and radius vector of the resulting point of intersection, one can obtain the sine, cosine, tangent, cotangent, secant, and cosecant of the given angle.

The sign of the sine, cosine, tangent and cotangent of the angle is determined by the signs of the rectangular coordinates of the designated trigonometric function. The sign of the secant and cosecant of an angle is determined by the sign of the sine and cosine respectively for the same angle.

Conversely, if the value of the sine or cosine, tangent or cotangent and secant or cosecant function of an angle are known, one may locate a point on the unit circle or on the specified tangents to the unit circle with coordinates appropriate to that value. This point together with the origin and the axis of abscissas determine an angle with the given value for that trigonometric function. The angle may be read in degrees of radians at the point of intersection of the fiducial line and the appropriate scale.

To aid in instruction, mechanical devices consisting of movable and fixed index lines and scales to aid in the determination of functional values for given values of the argument of the function have been proposed. See for example, U.S. Pat. Nos. 3,359,654, 3,359,653 and 3,302,308. Although these devices are probably of some aid in such instructions for the student or instructor to make use of the concept of the unit circle and its tangents for defining the trigonometric and inverse trigonometric functions, it is necessary in the present state of art to lay out, with the aid of the protractor and ruler, the required angle upon a reproduction of the rectangular coordinate system, the unit circle, and its appropriate tangents, or to measure distances to obtain the actual values of such functions.

The present invention allows the student and/or the instructor to lay out the angle easily and quickly without the use of the auxiliary equipment of ruler and protractor and provides the required coordinate system, unit circles and specific tangent lines automatically to be reused as many times as is desired. In addition, the device can be applied to the solution of many problems that occur frequently in the teaching of courses in technology and the application of technological principles in practice. In other words, the device has rendered the solution of many problems of interest in instruction and application of technology simple to perform and understand, and the answers required can be quickly obtained with a minimum of effort.

Thus, an objective of this invention is to provide a mechanical device for the easy, quick, and accurate determination of the trigonometric and inverse trigonometric functions. Another objective is to provide a mechanical device with which a student can easily understand the meaning of the trigonometric and inverse trigonometric functions and can easily see the full range of their variation in magnitude and sign as the value of their argument is continuously varied through the full domain of definition of the functions.

Another objective of this invention is to provide a mechanical device with which the instructor can demonstrate, to his classes, the meaning of the trigonometric and inverse trigonometric functions in such a way as to clearly and simply show the student the full range of variation in magnitude and sign of the trigonometric and inverse trigonometric functions for the full domain of definition of their arguments.

SUMMARY OF THE INVENTION

In overcoming one or more of the aforementioned disadvantages of conventional slide rules, and for achieving its other objects, the present invention provides a calculator comprising a rectangular coordinate system and an index member which are movable relative to one another so that the index member traces out a radius from the origin of the coordinate system. A scale of angles is provided for setting the radius at angles relative to a reference axis and a unit line is provided, superimposed on the coordinate system, from which trigonometric functions may be read in terms of the coordinate system.

BRIEF DESCRIPTION OF THE DRAWINGS

The features of the present invention which are believed to be novel are set forth with particularity in the appended claims. The invention, together with the further advantages thereof, may best be understood by reference to the following description taken in connection with the accompanying drawings, in the several figures of which like reference numerals identify like elements, and in which:

FIG. 1 is a perspective view of a calculator constructed in accordance with the present invention;

FIG. 2 is a plan view of the upper surface of the calculator depicted in FIG. 1, in which a part thereof, a rotatable arm, is shown in phantom outline;

FIG. 3 is a plan view of the rotatable arm part of the calculator of FIGS. 1 and 2;

FIG. 4 is a plan view of the other side of the calculator of FIGS. 1-3 illustrating a circular slide rule which is, in itself, well known and which is preferably incorporated as part of the calculator; and FIG. 5 is a sectional view of the calculator of FIGS. 1-4, generally as taken through the line V—V in FIG. 1, illustrating the manner of attachment of the various parts thereof.

DETAILED DESCRIPTION

Referring to FIG. 1 there is depicted a calculator constructed in accordance with the present invention and generally designated by the numeral 10. The calculator 10 comprises a planar base 12 of a rectangular shape having an opaque surface on one side of which is inscribed a generally square-shaped grid, generally designated 14. Rotatably secured above the base 12 at the center of the grid is an elongated flat arm 16. The arm 16, which is preferably constructed of a transparent material such as plastic, is secured at its center and extends across the base 12 so as to be capable of being rotated to overlay any part of the square grid 14.

As is better shown in FIG. 2, the grid 14 comprises a rectangular Cartesian coordinate system having an origin 18 centrally located in the grid 14 at the point of securement and the axis of rotation for the arm 16, which arm is, in this view, shown in phantom lines. For convenience in reference "vertical" and "horizontal" on the grid 14 shall be taken as indicating the vertical and horizontal directions as shown in FIG. 2.

The origin 18 is also the intersection point of a horizontal axis of abscissas 19, often termed the "x-axis," and a vertical axis of ordinates 20, often termed the "y-axis." The grid 14 also includes a number of lines parallel to the x-axis 19 which intersect the y-axis 20, as well as other lines parallel to the y-axis 20 which intersect the x-axis. Eleven major such parallel lines extending vertically or horizontally sequentially on either side of both of the major axes at equal successive distances are depicted in FIG. 2. These 44 lines are herein termed the major coordinate lines. Although to improve clarity, they are not depicted in FIG. 2, additional coordinate lines subdividing the space between the major coordinate lines are preferably employed. There may, for example, be three such lines equally spaced to divide the space into five parts.

The intersections of the major coordinate lines with the coordinate axes 19 and 20 generally have an associated indicia, such as the indicia 11X: "..1," at the intersection of the first major vertical coordinate line 20A to the left of the origin 18 or in the conventional "plus" direction. Only the outermost major coordinate lines (such as the line 20E defining the right-hand end of the grid 14 in FIG. 2) have no associated indicia. Otherwise such successive interception of a major coordinate line with the coordinate axes are designed by indicias which are of progressively larger values from the origin 18 by units of 0.1 and, for the conventional negative directions to the left and below the origin 18 have the preceding negative character "1."Thus, from left to right, the indicas adjacent to the intersections of the x-axis are from "11.0," "10.9," etc., to "0.9" and "1.0." Similar indicia are inscribed along the y-axis at the intersections of the major coordinate lines. The boundary lines (such as line 20E) may be considered by the user as representing 1.1 (plus or minus). If such indicia can conveniently and unconfusingly be placed adjacent to the interception of these lines, it is preferred that they be so placed.

The distance represented by the length from the origin 18 to any one of the intercepts denoted by the indicia "1.0" or "11.0" will be taken as the unit of measurement herein.

Superimposed on the rectangular coordinate grid 14 and preferably inscribed in a contrasting color (such as red) are two concentric circles, designated 21 and 22 with centers at the origin 18 of the coordinate grid, and radii of 0.1 unit and 1.00 unit respectively. The tangent lines 19T and 20T to the circle 22 of unit radius at the points 25 and 26 where the unit circle intersects the positive side of the y-axis 20 and x-axis 19, respectively, are also inscribed on the coordinate grid 14 in a contrasting color, again preferably red. The tangent lines 19A and 20A to the circle 21 of radius 0.10 unit at the points 27 and 28 where this circle intersects the positive side of the axis of abscissa 17 and the positive side of the axis of coordinates 18, respectively, are also inscribed on the coordinate grid 14 in a contrasting color, also preferably red. Around the perimeter of the rectangular grid 14 are inscribed two scales designated 34 and 35. Scale 34 is a scale in degrees of the angular measure of the angle defined by the positive side of the axis of abscissa 19 and a radius vector from the center of the unit circle 22 to a given scale mark. The scale designated 35, is a scale in radians of angular measure of the angle defined by the positive side of the axis of abscissas 20 and a radius vector from the center of the unit circle 22 to a given scale mark. The zero mark for the scales designated 34 and 35 coincides with the point where the positive side of the axis of abscissas 19 intersects the perimeter of the rectangular grid 14. The scale 34 preferably increases from 0° to 360° in whatever degree of steps can conveniently and unconfusingly be represented by scale marks and indicia in a counterclockwise direction about the origin 18 of the unit circle 22 when looking into the rectangular grid 14. The scale 35 increases from zero radians to two π (Pi) radians by whatever steps can conveniently and unconfusingly be represented by scale marks and indicia in a counterclockwise direction about the origin 18 of the unit circle 22 when looking into the rectangular grid 14. For convenience in the drawings, FIG. 2 has scale marks every 5° and 0.05 radian with indicia every 10° and 0.1 radian, it being understood that additional intervening marks and indicia may be added.

As best shown in FIG. 2, the transparent plastic arm 16 has a length equal to or slightly greater than that of the diagonal of the rectangular grid 14 and is of an elongated rectangular shape. The point of attachment for the plastic arm 16 is its geometrical center. The method of attachment is such that the arm 16 is free to rotate about its point of attachment 18 in a plane parallel to the base 12.

As best shown in FIG. 3, lengthwise down the center of the transparent arm 16 and through the point of attachment 18 is inscribed, preferably on the surface of the arm nearest the base 12, an index hairline 31.

This line 31 is parallel to each of the longitudinal edges 32 and 33 of the arm 16. A plane such as the plane 30 in FIG. 3, through the point of attachment 18 of the transparent arm 16, which is normal to the fiducial line 31, divides the arm 16 into two equal parts.

On one of these two halves (the right half as seen in FIG. 3) of the arm 16 a linear scale 44 is inscribed along the edge 32 of the plastic arm 16 preferably on the surface of the arm nearest the base 12. The origin of this scale 34 is the point of intersection of the edge 32 of the arm 29 and the plane 30. The scale 44 runs from zero at its origin to a larger number, in the same unit distance as the grid 14, and extends on the arm along the edge 32.

On this same half of the plastic arm 16 and the edge 33 is inscribed a reciprocal scale 46. This scale is also preferably inscribed on the surface of the arm 16 nearest the surface of the base 12. This scale 46 is placed along the edge 33 in such a way that a line perpendicular to the index line 31 and through a scale mark gives the reciprocal of the value associated with the scale mark.

On the other half of the arm 16 (to the left as seen in FIG. 3) a linear scale 39 is inscribed along the fiducial line 31 and on the surface of the transparent arm 16 again preferably on the surface adjacent to the base 12. The zero point of this scale 39 is inscribed along at the axis of rotation or origin 18 of the arm 16. The scale 39 extends to the end of this half of the arm. This scale 39 matches the scale of the rectangular grid 14 in unit length, and value of indicia.

Attached to the plastic arm 16 is a slide or rider 40, which is free to move along the arm in a direction parallel to the surface of the arm and parallel to the fiducial line 31. The range of motion of the slide 40 is the extent of the arm 16. The slide 40 has inscribed on its surface, preferably the surface nearest the base 12, an index hairline 41. The line 41 is perpendicular perpendicular to the index line 31 of the arm 16 in all positions it is free to assume.

Referring now to FIG. 4, the reverse side of the calculator 10 will be briefly described.

In this view a circular slide rule, generally designated 60, is depicted which includes four circular logarithmic scales: A "D" scale designated 63, a "C" scale designated 64, a "CI" scale designated 65, an "A" scale designated 66, and a "K" scale designated 67. These scales are not shown in detail as they, in themselves, are well known.

The logarithmic scales designated 63, 64, 65, 66 and 67 therein are each inscribed along concentric circles whose common origin is the point 18 and whose radii have successively larger values. The origins of each of the scales 64, 65, 66 and 67 lie along a common raidus line 68 from the center 18'.

The "C," "CI," "A" and "K" scales 64, 65, 66 and 67 are each inscribed on the planar base member 12, but the "D" scale 63 is inscribed on a planar disc 70 which is mounted for rotation about the origin point 18' in a plane parallel and adjacent to that of the base 12.

A transparent elongated arm 75 is attached to the base 12 and the disc 70 at the point 18' in such a way that it is free to rotate in a plane parallel to and immediately over the base 12 and disc 70. The arm 75 extends from one side of the origin 18' to just beyond the outermost scale 67. The index hairline 76 is inscribed on the surface of this half-arm 75 preferably on the surface thereof that is adjacent to the disc 70 and base 12. The line 76 passes through the point of attachment 18' and runs the length of the half-arm.

Referring now to FIG. 5, a preferred construction and interconnection of the parts of the calculator 10 is there illustrated. As can best be seen in that FIGURE, the rotatable arm 16 disc 70 and half-arm 75 are all affixed to the base 12 by means of a rivet 79 centered at an axis 18'' perpendicular to the members 16, 12, 70 and 75 and passing through their origins 18 and 18'. Between the numbers 16 and 12, 12 and 70 and 70 and 75 spacer washers 78 may be provided to insure a proper level of friction therebetween. As can also be best seen in FIG. 5, the slide 40 and the upper end of the rivet 79 are proportioned so as to allow the slide 40 to easily pass over the rivet.

Operation

In using the calculator 10 to solve trigonometric problems, the operator moves the arm 16 to a position corresponding to the information he has been given and reads by inspection the desired values. Thus, if he has an angle in degrees specified he can set the arm so that the hairline 31 overlays the specified angle on the degree scale 34 and be able to read by inspection, the equivalent radian value of the angle, the values of the sine, cosine, tangent, cotangent, secant and cosecant function of that angle including their sign (+ or −). Should he have been given any of these quantities he can read, by inspection, the other quantities.

This can be done by any setting of the arm 16 by either remembering or deriving the following rules for whatever angle the arm is set to:

I. The sine is the $y$-value of the interception of the radius portion of the line 31 and the unit circle;

II. the cosine is the $x$-value of that interception;

III. the tangent is the $y$-value of the interception on the line 31 and the $x=1$ line 20T;

IV. the contangent is the $x$-value of the interception of the line 31 and the $y=1$ line 19T;

V. the secant is the value along the line 31 from the origin 18 to the intercept of line 31 with the $x=1$ line 20T, which value has the same sign (+ or −) as that of the sine;

VI. the cosecant is the value along the line from the origin 18 to the intercept of the line 31 with the $y=1$ line 19T.

The above rules are generally true except for the occasions when the intercept points lie off of the grid 14. For those occasions the operator need only change scale factor, as by treating the $x$ or $y=0.1$ lines 20A or 19A as the $x$ or $y=1$ line and the above rules continue to hold. By minimal calculations, other scale changes may be made.

Similarly, if the user is given any of the trigonometric function values he can derive any of the other trigonometric values as well as the arc trigonometric values in degrees or radians by setting the arm 16 so that the line 31 overlays the corresponding intercept point.

In addition, the calculator 10 may be employed to convert from polar coordinates to rectangular coordinates or vice versa by setting the line 31 over the defined point and reading the corresponding values in the other coordinate system. By altering the scale factor any valued coordinate point may be assigned a position in the grid 14 and its corresponding coordinate point determined. The hairline 41 of the slide 40 is particularly useful in this operation because it may also be placed over the coordinate point.

Essentially the same operation is employed to convert vectors into their components. This is especially useful in electrical calculations herein the axis 20 may be considered the imaginary axis. When calculating circuit or component impedance or admittance, the other value (admittance or impedance) may be quickly calculated using the scales 44 and 46. That is, by setting the hair line 41 of the slide 40 over the value of one or either scale 44 or 46 the value of the other is given on the other scale 46 or 44. If the value is located on line 31 along the scale 44 its reciprocal can be read immediately on scale 46 simply by placing the hairline over the point.

The ease of above operation is perhaps best illustrated by means of examples. The values given in these examples are, of course, approximations made by visual inspection on a working model of the invention employing a grid 14 of approximately 11 by 11 inches with nine lines between the major coordinate lines.

EXAMPLE 1

Referring now to FIG. 1 we may generally illustrate the use of the calculator for finding the sine of an angle $\alpha$ in the following way. The index line 31 is first made to be coincident with the scale mark in degrees or radians on scales 34 or 35 corresponding to the given value of the angle $\alpha$. The point of intersection 100 of the line 31 and the unit circle 22 is then located. The ordinate of the point 100 as read on the axis of ordinates or $y$-axis then gives the numerical value of the sine of the angle $\alpha$ in magnitude an in sign.

If the tangent of the angle $\alpha$ is required, the line 31 again is made to be coincident with the appropriate degree (or radian)

mark on scale 34 or 35. The point of intersection of the fiducial line and the tangent line 20T to the unit circle 22 is then determined. The ordinate of this point as read on the y-axis then gives the numerical value of the tangent of the angle $\alpha$.

When the angle $\alpha$ is numerically between approximately 47° and 134°, the point of intersection of the line 31 and the tangent line 19T to the unit circle 22 lies off the surface of the calculator. For these angles, one uses the intersection of the fiducial line 31 and the tangent line 20A to the circle 21 of the radius 0.10 units. The ordinate of the interception point as read from the axis is to be multiplied by the factor 10 to give the tangent of the angle.

EXAMPLE 2

For a more specific example take this problem: Given an angle of 0.95 radians, determine all of the trigonometric function values for that angle. This example is illustrated in FIG. 2 by the position of the line 31 of the arm 16.

I. The sine of 0.95 radians is the y-value of the interception of the radius portion for 0.95 radians of the line 31 and the unit circle 22 or 0.81.

II. the cosine of 0.95 radians is the x-value of that intercept or 0.575.

III. The tangent is the y-value of the intercept between line 31 and the $x=1$ line which would line off the grid 14 of the line 20T is taken as $x=1$. However, using the line 20A as $x=1$, the tangent can be seen to be 1.40 (remembering the scale change).

IV. The cotangent is the x-value of the interception of line 31 and the $y=1$ line or 0.715.

V. The secant is the value on the scale of line 31 at the interception of that line with the $x=1$ line. Changing scales and using the line 20A, this is: 1.4, in absolute value and, as the sine of this angle is positive, this value is positive also.

VI. The cosecant is the value on the scale of line 31 at the interception of that line with the $y=1$ line or 1.24.

EXAMPLE 3

What is the polar or vector components of the following complex number: $-7.3-10i$? Assuming, as is conventional, that the y-axis is the imaginary number axis the arm 16 is moved to have the line 31 over this point. This is, again illustrated in FIG. 2 (point 33P) and assuming a scale change of 10 times the shown values, the polar coordinates is 12.4 at 235°. This number is obtained by moving the slide 40 until the hairline 41 lies over the point 33P and reading the value of the hairline on scale 44. If this value were impedance, the admittance could be read immediately on the scale 46 and found to be 0.80 at 235°. This can then be transformed back into rectangular coordinates of $-0.47 -0.65i$ (mhos), by moving the hairline 41 to 0.80 on the scale 46 and reading the coordinates of the point where the hairline 41 crosses the line 31.

EXAMPLE 4

Find the tangent and cosine of $-125°$. Negative angles are not indicated in FIG. 2, by indicia, but if they can be unconfusionally and clearly added it is preferred that they be so added. However, even without such a scale it will be clear to the student that $-125°$ is the same setting for the arm 16 as $+235°$ ($360°-\alpha^{125°}=235°$). This setting is also indicated in FIG. 2. As the tangent is the y-value of the interception of line 31 and the $x=1$ line, this is seen by inspection (at the interception of lines 31 and 20A) to be 1.4, a positive number. The cosine is the x-value of the interception of line 31 and the unit circle 22 or $-0.58$.

Although the calculator 10 has been particularly described in the solution of problems, it should be understood that it also can be used to illustrate and teach the trigonometric functions.

The preferred construction of the calculator 10, as illustrated, is of plastic material or paper laminated with hard clear plastic, although other materials such as paste board may be used for economy. Also although illustrated in conjunction with a circular slide rule 60 that slide rule is not necessary to the practice of the present invention, at least in its broader aspects.

It should now be clear that the new and improved calculator has been described which is versatile in its uses.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A calculator comprising:
   a base defining a generally planar surface on which is inscribed a four quadrant rectangular coordinate grid having an origin,
   said grid includes:
       an x-axis extending in both the positive and negative x directions from the origin for at least one unit,
       a y-axis extending in both the positive and negative y directions from the origin for at least one unit,
       a plurality of coordinate lines parallel to the x-axis and to the y-axis including at least 10 major coordinate lines spaced 0.1 unit apart along each of the positive and negative x and y axes,
       a plurality of indicia inscribed on said base surface indicating the x and y values of at least some of the intercepts between said plurality of coordinate lines and the x and y axes,
       a unit radius circle inscribed on said base surface with its center at the origin,
       a second circle inscribed on said base surface with its center at the origin and having a smaller than one unit diameter;
       an elongated and generally flat arm defining a longitudinally extending index line,
       said arm being rotatably affixed to said base such that said index line extends radically from the origin of said grid to overlay said grid and is rotatably about the origin to overlay any point on said grid at any angle relative to the positive x-axis,
   said line-defining arm also has a scale defined thereon along said index line in the same units as said rectangular grid and has indicia indicating values of said scale in said units as measured from the origin along the index line of said arm; and
   an angular scale is defined on said planar surface of said base so as to give the relative angular position of said index line with respect to the positive x-axis.

2. The calculator as defined in claim 1, wherein:
   said grid includes an additional major coordinate line in each of the positive and negative x and y directions,
   said major coordinate lines $x=+1$ and $y=+1$ are made conspicuous; and
   said second circle is made of a radius of 0.1 unit and the $x=+0.1$ and $y=+0.1$ lines are also made conspicuous.

3. The calculator as defined in claim 2, wherein:
   a pair of reciprocal scales are defined on a portion of said arm; and
   a slide defining a hairline perpendicular to the index line of said arm is movable mounted on said index line arm, with the hairline extending so as to reach between said pair of reciprocal scales when the slider is moved over the portion of said arm, is provided.

4. The calculator as defined in claim 3, wherein:
   said base is an opaque planar member with two flat planar surfaces, said grid and arm being on and adjacent to one of said surfaces and the other surface forming part of a circular slide rule which includes a rotatable disc and rotatable half-arm.

5. The calculator as defined in claim 4, wherein:

said base is of a generally square shape, said slide rule disc, half-arm and index line defining arm are all rotatably attached to said base by means of a single fastener;

said base, disc, half-arm, index line arm and slide are all formed of hard plastic material;

said half-arm, index line arm and slide are all formed of clear material and have their respective lines formed on the surfaces thereof adjacent, respectively, to said disc, said grid, and said index line arm; and said two circle lines as well as said $x=+0.1$, $x=+1$, $y=+0.1$ and $y=+1$ lines are made conspicuous by making them red in color.

6. The calculator is defined in claim 3, wherein the angular scale is inscribed in a generally square margin about the grid on said base.

7. The calculator as defined in claim 6, wherein:

a second angular scale is inscribed marginally about the grid of said base with one of said two angular scales being marked in radians and the other in degrees.

UNITED STATES PATENT OFFICE
CERTIFICATE OF CORRECTION

Patent No. 3,610,519  Dated October 5, 1971

Inventor(s) Svetislav M. Radosavljevic et al.

It is certified that error appears in the above-identified patent and that said Letters Patent are hereby corrected as shown below:

Column 1, line 2, "Filed" should read -- Field --; line 41, after "84° 16'" cancel "A". Column 3, line 71, "..1," should read --".1" --. Column 4, line 6, '"/"' should read -- "-" --; line 7, '"/1.0,"' and "/0.9," should read -- "-1.0," and -- "-0.9," --; line 16, '"/1.0"' should read -- "-1.0" --. Column 5, line 17, cancel "inscribed along"; line 28, cancel "perpendicular"; line 42, "raidus" should read -- radius --. Column 6, line 54, "31." should read -- 31 --. Column 8, line 42, "rotatably" should read -- rotatable --; line 65, "movable" should read -- movably --.

Signed and sealed this 18th day of July 1972.

(SEAL)
Attest:

EDWARD M. FLETCHER, JR.　　　　　　　　ROBERT GOTTSCHALK
Attesting Officer　　　　　　　　　　　　Commissioner of Patents